United States Patent Office 3,689,463
Patented Sept. 5, 1972

3,689,463
METHOD OF PRODUCING LIQUID WATER-SOLUBLE UREA-FORMALDEHYDE RESINS EMPLOYING AN ARYL OR ALKYL SULFONIC ACID
Anatoly Abramovich Kruglikov, ulitsa Vyazovskaya 9, kv. 9; Militina Alexeevna Nikolaeva, ulitsa Vyazovskaya 13, kv. 15; Simon Borisovich Vilker, ulitsa Pervomaiskaya 70-a, kv. 12; and Viktor Vasilievich Detkov, ulitsa Tsiolkovoskogo 17, kv. 13, all of Nizhny Tagil, U.S.S.R.
No Drawing. Filed May 7, 1971, Ser. No. 141,425
Int. Cl. C08g 9/10, 9/32
U.S. Cl. 260—70 R  10 Claims

ABSTRACT OF THE DISCLOSURE

A method of producing liquid water-soluble urea-formaldehyde resins comprising successive condensation of urea and formaldehyde in an alkaline, acidic and neutral media. An acidic medium is created by introducing aromatic or aliphatic sulphonic acids. Concentration in the neutral medium is carried out with the addition of formaldehyde. Said process conditions ensure the producing of resins featuring an unlimited water-solubility in any proportions, such unlimited water-solubility of the resins being combined with stability of this property under prolonged storage.

---

The present invention relates to a method of producing liquid water-soluble urea-formaldehyde resins which are used as binders and adhesives, and also to the resins produced in accordance with the method of the invention.

The methods of producing liquid urea-formaldehyde resins so far known in the art make it possible to produce only such resins whose solubility in water is limited. When mixed with a certain amount of water, these resins either coagulate from the solution or the solution becomes turbid due to the formation of a solid phase.

However, for a number of applications it is desirable that urea-formaldehyde resins should feature an unlimited solubility in water and could be used in diluted aqueous solutions. The unlimited solubility in water is understood here as the miscibility of the resin with water in any proportions with the formation of a transparent solution without coagulation of the resin or turbidity of the solution, with this property of the resin being preserved over long periods of time.

Fields of application in which the use of urea-formaldehyde resins featuring an unlimited water-solubility is desirable comprise, in particular, the manufacture of heat-insulation articles based on mineral or glass wool and also of special kinds of paper, such as paper with an enhanced water-resistance. What is required here is just a complete solubility of the resin in water, in combination with a high adhesive power, stability of the properties under storage conditions and water-resistance of the set product. Urea-formaldehyde resins with a limited solubility that are produced by the known methods do not feature said range of properties.

The methods of producing urea-formaldehyde resins that feature a certain limited water-solubility are known in the art and have found practical implementation.

U.S. Patent No. 2,242,484 teaches the producing of urea-formaldehyde resins by reacting urea and formaldehyde in an acidic medium at a boiling point, followed by introducing a 10–20% ethanol into the composition. The introduction of the latter is conducive to an enhancement of the water solubility of the resin, but no complete solubility thereof can be attained thereby.

A method is known of producing a product of condensation of urea, formaldehyde and a sulphonated phenolic compound, disclosed in U.S. Patent No. 3,340,215, said product featuring a limited solubility in water. According to this method the condensation of urea, formaldehyde and a sulphonic-acid phenol is carried out at a temperature of 70–102° C. till a transparent solution is formed. Due to a great amount of the sulphonic-acid phenol to be introduced into the reaction mixture, the resulting product is not a pure urea-formaldehyde polymer, but is, actually, a mixed urea-phenol-formaldehyde polymer.

FRG Patent No. 1,241,612 envisages the interaction of urea and formaldehyde in an acidic medium at a temperature of 90–93° C. and subsequent condensation of the product thus obtained with an additional amount of urea, thiourea, urethan or melamine. The urea-formaldehyde resins produced by this method feature a limited solubility in water.

French Patent No. 1,540,926 teaches the condensation of urea and formaldehyde to be carried out successively at different temperatures and at different pH values of the reaction mixture in different stages. The urea-formaldehyde resins produced in accordance with the last-mentioned method also feature a limited solubility in water.

The main disadvantage of all the methods known heretofore lies in the limited water-solubility of the resins produced. An addition of a certain amount of water to such resins or to their solutions results either in turbidity of the solution or in coagulation of the resin.

The object of the present invention is to provide a method of producing such liquid urea-formaldehyde resins which would feature an unlimited solubility in water and exhibit high adhesive properties, stability under storage conditions and water-resistance after setting.

According to the invention, said object is accomplished by carrying out condensation of urea and formaldehyde successively in an alkaline, acidic and neutral media at elevated temperatures with the use, as an acid catalyst, of aromatic or aliphatic sulphonic acids, the condensation being completed, after the concentration of the resin solution, in the presence of an additional amount of formaldehyde.

The condensation of urea and formaldehyde in an alkaline medium is carried out at pH ranging from 7.2 to 9.0 and at a temperature ranging from 60 to 102° C. From 1.5 to 4 moles of formaldehyde are taken per mole of urea. The process of condensation in the alkaline medium is continued till a low-molecular resinous product is obtained.

At the stage of condensation in an acidic medium the process of further condensation is carried out in the presence of organic sulphonic acids conforming to the general formula R—SO$_3$H where R is an aryl or alkyl, at pH ranging from 2.0 to 6.0 and a temperature ranging from 60 to 102° C. till a resinous tacky product is formed.

The resulting reaction product is then neutralized with an alkaline agent up to the pH to become 7.2–9.0 and concentrated with the removal of 0 to 90% of water.

Next an additional amount of formaldehyde is introduced equal to 20–30% of that initially introduced, and condensation is carried out in a neutral medium at a temperature of 60 to 102° C., till the content of free formaldehyde in the resin is 4 to 7%.

After cooling, the resin is stabilized with an alkaline agent and the desired product is thus produced.

The condensation in the alkaline medium should preferably be carried out at a ratio of about 2 moles of formaldehyde per mole of urea, at pH ranging from 7.2 to 8.0 and a temperature of from 96 to 100° C.

The condensation in the acidic medium should prefably be effected with the use of benzene sulphonic acid as a sulphonic acid, as it ensures the most favourable process conditions and is a most easily available compound among those belonging to the class of sulphonic acids. However, other aromatic and aliphatic sulphonic acids can likewise be used for the purpose, particularly such as toluene sulphonic acids, xylene sulphonic acids, naphthalene sulphonic acids, salicyl-sulphonic acid, ethyl-sulphonic acid, butyl-sulphonic acid, octyl-sulphonic acid, as well as sulphonic acids obtained by sulphonation of paraffin hydrocarbons, the latter being treated either individually or in the form of mixtures of such hydrocarbons.

It is desirable that the process of condensation in the acidic medium should be carried out at pH ranging from 5.0 to 5.5 and at a temperature ranging from 96 to 100° C.

Neutralization of the reaction product after the condensation in the acidic medium should preferably be effected with sodium hydroxide to pH of from 7.2 to 7.5.

Concentration of the resin solution should be preferably carried out at a residual pressure ranging from 100 to 350 mm. Hg till 70–80% of water are removed.

When carrying out condensation of the concentrated resin with the additional amount of formaldehyde, the latter should be preferably introduced in a quantity of about 25% of the initially introduced formaldehyde. This stage of condensation which is very important for ensuring an unlimited solubility of the final product, should be preferably carried out at pH ranging from 6.8 to 7.2 at a boiling point, preferably at temperature ranging from 96 to 100° C. At temperatures below the specified range a smaller amount of formaldehyde will participate in the reaction. At this stage the condensation process should best be run till the content of formaldehyde in the resin becomes from 4 to 7%, so that after the cooled product has been stabilized with an alkaline agent the content of formaldehyde in the final product be from 4.0 to 5.5%. A lower content of free formaldehyde in the final product will impair the solubility of the resin and its stability under storage.

For stabilizing the resin, it is most preferable to use ammonia water as an alkaline agent, with the pH of the resin to be adjusted to lie within 7.5 to 9.0.

The resins produced in accordance with the present invention are characterized by the following properties.

As to their appearance, they are homogeneous transparent liquids. The solubility of these resins in water is unlimited. The addition of any amount of water to the resin results in the formation of a homogeneous transparent solution, without coagulation of the resin or turbidity of the solution indicative of the solid phase separation out of the solution.

The content of dry matter in the resins produced in accordance with the present invention usually exceeds 60%, but when required, for instance, in case the resin is to be used in the form of diluted aqueous solutions directly in situ, the content of dry matter in the resin can be reduced down to a value close to 40%.

The pH of these resins lies within 7.5 to 9.0 and the content of free formaldehyde therein varies from 4.0 to 5.5%.

The viscosity of these resins, as determined on a B3–1 viscometer with the nozzle diameter of 5.4 mm., at a temperature of 20° C., ranges from 5 to 40 sec.

The resins produced by the method of the invention preserve their properties over a period longer than 6 months, this being quite sufficient for transporting the resins over long distances, their storage and subsequent use.

These resins, as well as their aqueous solutions exhibit a high cementing power; thus, when polished glass plates ar lapcemented with a 17% aqueous solution of said resins, the shear strength of the joint is 20–30 kg./cm.$^2$, this being more than twice as high as the shear strength of the joint between the same glass plates when cemented with a 17% aqueous solution of water-soluble phenol-formaldehyde resins known as phenolic alcohols (7–10 kg./cm.$^2$).

When set, the resins produced in accordance with the present invention are superior to phenolic alcohols as regards their water-resistance. Set samples of these resins when kept under conditions of 100% humidity gain in weight 20–25% less than samples of set phenolic alcohols kept under the same conditions.

High water-resistance of the resins produced in accordance with the present invention exhibited by these resins after setting is evidently due to peculiarities of their chemical structure. In the set product hydrophilic methylol groups are practically absent.

The present invention is advantageous in that it ensures the producing of urea-formaldehyde resins that combine an unlimited water-solubility, without turbidity of the solution or coagulation of the resin, with a high cementing power and stability of the properties at prolonged storage, as well as water-resistance after setting.

Complete water-solubility of the resins produced by the method of the invention makes them fit for use in diluted aqueous solutions. High tackiness of such solutions makes them usable for cementing mineral fibres, glass, wood and other materials. Stability of the resin properties with time ensures its preservation during at least 6 months after the preparation, still fit for use. Their high water-resistance after setting makes these resins applicable in such locations where the set product may be subject to moisture effects.

Essential advantages offered by the resins produced according to the invention become particularly apparent if one compares them with the above-mentioned water-soluble phenol-formaldehyde resins (phenolic alcohols) employed as binders in the manufacture of mineral wool heat-insulation articles.

In the range of properties exhibited by the resins of the invention the latter are much superior to phenolic alcohols when used as a binder for preparing heat-insulation materials on the basis of mineral or glass fibres.

Adhesion of these resins to mineral and glass fibres is more than twice as high as that of phenolic alcohols. Therefore, articles produced from mineral wool with the use of said resins, feature higher strength, with the same amount of binder.

Water solubility of these resins is higher than that of phenolic alcohols, so that more diluted solutions of such resins can be used for spraying mineral fibres, this providing for a better distribution of the binder over the fibre and, hence, a better quality of the resulting heat-insulation articles.

Setting or curing of the resins produced according to the present invention proceeds at a temperature of 160–170° C. instead of 180–210° C. as required for phenolic alcohols, the result being a reduction in the power consumption for curing the binder. The rate of curing of the resins produced in compliance with the invention can be controlled with an adequate precision by introducing small amounts of ammonium chloride, whereas the curing rate of phenolic alcohols can be controlled only by varying the temperature.

Phenolic alcohols contain considerable amounts of free alkali which produces a deleterious effect on mineral fibres. The resins produced according to the present invention are stabilized with ammonia water and thus do not contain free alkali, so that heat-insulation articles have a much longer service life.

The guaranteed term of storage for phenolic alcohols does not exceed 2 months. The resins produced according to the present invention can be stored for more than 6 months after the manufacture without any changes, in their quality characteristics.

Phenolic alcohols contain several percent of free phenol, so that they prove to be noxious to handle. The use of the resins of the present invention instead of phenolic alcohols, makes it possible to eliminate this disadvantage.

The presence of several percent of free phenol in phenolic alcohols necessitates the provision of dephenolizing purification plants at enterprises engaged in processing phenolic alcohols to avoid contamination of water basins and pollution of air with phenol. The use, instead of phenolic alcohols, of water-soluble urea-formaldehyde resins produced in accordance with the present invention, which do not contain phenol at all, rules out the necessity in erecting and making use of dephenolizing purification plants in the manufacture of heat-insulation articles based on mineral and glass wool.

Phenolic alcohols are produced with a concentration of about 50% of dry matter, whereas the resins acording to the present invention can be produced with the content of dry matter of over 60%, this offering an essential advantage for their transportation.

Since the cost of urea in any case is essentially lower than that of phenol, the cost of the resins produced by the method of the invention is essentially lower than the cost of phenolic alcohols.

The method of the present invention is also advantageous in that it can be realized both continuously and periodically, the latter techniques being preferable.

The continuous process of producing urea-formaldehyde resins that have an unlimited water-solubility, according to the present invention, can be practically realized as follows.

The reaction mixture with a required urea-to-formaldehyde ratio is continuously fed at a constant rate into a first reactor equipped with a reflux condenser, a stirrer and a steam jacket, where under the conditions of continuous stirring and heating the mixture undergoes condensation in an alkaline medium. The resulting product, passing through a water seal, continuously flows into a second reactor equipped similarly to the first one. In this second reactor, which is continuously fed with a solution of an aromatic or aliphatic sulphonic acid, there takes place condensation in an acidic medium under the conditions of continuous stirring and heating. From the second reactor the condensation product is continuously delivered through a water seal into a continuous-action evaporator, where the resin is concentrated and the condensate is continuously let out through a barometric leg, while the concentrated resin is continuously supplied into a third reactor that has the same equipment as the first and second reactors. In the third reactor, which is continuously fed with a solution of formaldehyde, the resin undergoes condensation in a neutral medium under stirring and heating. The product resulting in the third reactor is continuously fed through a water seal into a tubular heat exchanger where it is cooled and then fed into a fourth reactor equipped with a stirrer, this fourth reactor being continuously supplied with an alkaline agent to stabilize the product delivered from the heat exchanger. From the fourth reactor the final product is continuously transferred into storage receptacles.

The process of producing resins in accordance with the present invention can be easily automated.

The examples which follow are given to illustrate the way in which the method of the invention can be realized and should in no way be regarded as restrictive ones. Unless otherwise specified, weight parts are indicated in the examples.

EXAMPLE 1

A metallic reactor equipped with a condenser, a stirrer and a steam jacket is charged with 298 parts of a 37% solution of formaldehyde, with its pH adjusted to be 7.5 through treatment with a 3% solution of sodium hydroxide, and 100 parts of urea. After the urea has dissolved under stirring, steam is admitted into the steam jacket and the mixture is heated to a boiling point during 1 hour. At a temperature of 96–97° C. the mixture is kept over a period of 45 min. under stirring, whereupon ethyl-sulphonic acid is introduced into the reactor in the form of a 2 N-solution till the pH becomes 5.3. In the acidic medium the condensation at 96–97° C. is carried out during 45 min. After that a 3% solution of sodium hydroxide is introduced into the reactor till pH=7.4. The condenser is switched over to parallel-current and at a residual pressure of 250 mm. Hg the resin is concentrated till the refractive index is 1.482. After that the vacuum is released and the condenser is switched over to reflux, 75 parts of a 37% solution of formaldehyde are introduced into the reactor, the mixture is heated to a boiling point and at 96–97° C. condensation is effected in a neutral medium during 15 min. at pH=6.9 till the content of free formaldehyde is 6.1%. Then by supplying water into the reactor jacket the resin is cooled down to 40° C. and 1.2 parts of 25% ammonia water are introduced into the reactor. After 15 minutes of stirring, the ready resin is drained from the reactor.

The resin thus obtained has the following characteristics.

External appearance, homogeneous transparent liquid; solubility in water, complete, in any proportions, without coagulation of the resin or turbidity of the solution; content of dry matter in the resin, 61.3%; viscosity as measured on B3–1 viscometer with a nozzle 5.4 mm. in diameter at 20° C., 14 sec.; pH=8.1; content of free formaldehyde, 4.9%; stability under storage, 7 months.

EXAMPLE 2

The process is carried out as described in Example 1, but instead of ethyl-sulphonic acid a mixture of sulphonic acids is used that are obtained by sulphonating a mixture of paraffin hydrocarbons with an average molecular weight of 250.

The characteristics of the resin obtained are as follows.

External appearance, homogeneous transparent liquid; solubility in water, unlimited, in any proportions, without coagulation of the resin or turbidity of the solution; content of dry matter in the resin, 63.6%; viscosity as determined on B3–1 viscometer with a nozzle 5.4 mm. in diameter at 20° C., 18 sec., pH=7.6; content of free formaldehyde, 4.7; resin stability under storage, 6 months.

EXAMPLE 3

A metallic reactor similar to that described in Example 1 is charged with 271 parts of a 37% solution of formaldehyde treated with a 4% solution of sodium hydroxide to pH=7.4, and with 100 parts of urea. After the dissolution of the urea, the mixture is heated under stirring to a boiling point during 1 hour. At a temperature of 96–100° C. the mixture is kept for 45 min. under stirring, and then benzene sulphonic acid in the form of a 1 N-solution is introduced into the reactor to pH=5.2. In the acidic medium the condensation at 96–100° C. is carried out during 45 min. After that a 4% solution of sodium hydroxide is fed into the reactor to pH=7.5, the condenser is switched over to parallel-current and at a residual pressure of 300 mm. Hg the resin is concentrated to the refractive index of 1.483. Then the vacuum is relieved, the condenser is switched over to reflux, 55 parts of a 37% solution of formaldehyde are fed into the reactor, the mixture is heated to boiling and at 96–100° C. condensation is carried out in the neutral medium at pH=7.0 during 15 min. till the content of free formaldehyde is 5.7%. Then the resin is cooled down to 40° C. by supplying water into the reactor jacket and 1.2 parts of 25% ammonia water are introduced into the reactor. After 15 min. of stirring the ready resin is drained from the reactor.

The resin thus produced has the following characteristics.

External appearance, homogeneous transparent liquid; solubility in water; complete, in any proportions, without coagulation of the resin or turbidity of the solution; content of dry matter in thte resin, 64.2%; viscosity as measured on B3-1 viscometer with the nozzle diameter of 5.4 mm. at 20° C., 22 sec.; pH=7.9; content of free formaldehyde, 4.6%; stability of resin under storage 7 months.

EXAMPLE 4

The process is carried out as set forth in Example 3, but naphthalene-sulphonic acid is used instead of benzene-sulphonic acid.

The resultant resin features the following characteristics.

External appearance, homogeneous transparent liquid; solubility in water, complete, in any proportions, without coagulation of the resin or turbidity of the solution; content of dry matter in the resin, 62.7%; viscosity as measured on B3-1 viscometer with the nozzle diameter of 5.4 mm. at 20° C., 15 sec.; pH=7.5; content of free formaldehyde, 5.0%; resin stability under storage conditions, 6 months.

EXAMPLE 5

The process is carried out by following the procedure described in Example 3, but with the use of salicyl-sulphonic acid instead of benzene-sulphonic acid.

The resultant resin has the following characteristics.

External appearance, homogeneous transparent liquid; solubility in water, complete, in any proportions, without coagulation of the resin or turbidity of the solution; content of dry matter in the resin, 62.9%; viscosity as measured on B3-1 viscometer with the nozzle diameter of 5.4 mm. at 20° C., 12 sec.; pH=7.8; content of free formaldehyde, 4.8% resin stability under storage conditions, 8 months.

EXAMPLE 6

The process is carried out as described in Example 1, but after the concentration of the resin under vacuum 60 parts of a 37% solution of formaldehyde are introduced into the reactor instead of 75 parts thereof.

The resultant resin features the following characteristics.

External appearance, homogeneous transparent liquid; solubility in water, complete, in any proportions, without coagulation of the resin or turbidity of the solution; content of dry matter in the resin, 64.1%; viscosity as measured on B3-1 viscometer with the nozzle diameter of 5.4 mm. at 20° C., 24 sec.; pH=7.6; content of free formaldehyde, 4.1%; resin stability under storage conditions, 7 months.

EXAMPLE 7

The process is carried out as described in Example 1, but the resin is stabilized by introducing a 3% solution of sodium hydroxide into the reactor to pH=7.5.

The resultant resin has the following characteristics.

External appearance, homogeneous transparent liquid, solubility in water, complete, in any proportions, without coagulation of the resin or turbidity of the solution; content of dry matter in the resin, 62.8% viscosity as measured on B3-1 viscometer with the nozzle diameter of 5.4 mm. at 20° C., 16 sec.; pH=7.5; content of free formaldehyde, 5.0%; resin stability under storage conditions, 6 months.

EXAMPLE 8

The present example is given to illustrate the continuous process of producing urea-formaldehyde resins with an unlimited water-solubility, according to the invention.

A reaction mixture, comprising 271 parts of a 37% solution of formaldehyde per 100 parts of urea, said formaldehyde solution having been pre-treated with a 4% solution of sodium hydroxide to pH=7.4, is continuously fed into a first reactor, equipped with a reflux condenser, a stirrer and a steam jacket, at a rate ensuring the mass residence time in the reactor equal to 45 min. The temperature in the reactor is maintained within 96–100° C.

The condensation product obtained in the first reactor is supplied through a water seal into a second reactor equipped similarly to the first one. A 1 N-solution of benzene-sulphonic acid is likewise continuously fed into the second reactor in an amount to ensure the pH of the product in the reactor equal to 5.3. The temperature in the second reactor is maintained within 96–100° C. The residence time of the product in the second reactor is 45 min. From the second reactor the product is continuously supplied through a water seal into an evaporator operating in a continuous mode. In the evaporator under a residual pressure of 300 mm. Hg the resin is concentrated to the refractive index of 1.480, with a continuous removal of the condensate through a barometric leg, the concentrated resin being continuously transferred into a third reactor equipped similarly to the first and second rectors. The third reactor is also continuously supplied with a 37% solution of formaldehyde in an amount of 25% of the formaldehyde incoming into the first reactor with the initial mixture. The temperature in the third reactor is maintained within 96–100° C. The residence time of the product in this reactor is 15 min. From the third reactor the product is continuously delivered through a water seal into a tubular heat exchanger, where the product is cooled down to 40° C. and then transferred into a fourth reactor equipped with a stirrer, into which fourth reactor 25% ammonia water is also continuously admitted in an amount ensuring the pH of the resin in the reactor to be within 7.5–9.0 and the content of free formaldehyde in the resin to range from 4.0 to 5.5%. From the fourth reactor the final product is continuously discharged into storage receptacles.

The characteristics of the final product are as follows.

External appearance, homogeneous transparent liquid; solubility in water, complete, in any proportions, without coagulation of the resin or turbidity of the solution; content of dry matter in the resin, 62.8% viscosity as measured on B3-1 viscometer with the nozzle diameter of 5.4 mm. at 20° C., 11 sec.; pH=7.5; content of free formaldehyde, 4.7%; resin stability under storage conditions, 7 months.

What is claimed is:

1. A method of producing liquid water-soluble urea-formaldehyde resins featuring an unlimited solubility in water and combining their complete solubility in water with the stability of this property at prolonged storage, comprising condensation of urea with formaldehyde at temperatures ranging from 60 to 102° C. at a molar ratio of 1.5 to 4 moles of formaldehyde per mole of urea at a pH ranging from 7.2 to 9.0 till a low-molecular resinous condensation product is obtained; reacting the resulting condensation product with an organic acid conforming to the general formula R—$SO_3H$ where R is an aryl or an alkyl that ensures the pH value to reach 2.0–6.0 and further condensation of the reagents at a temperature within 60–102° C. till a resinous tacky product is formed; neutralizing said condensation product with an alkaline agent raising the pH value to 7.2–9.0; concentrating the neutralized product with the removal of from 0 to 90% of water contained therein, as determined by the refractive index attained; reacting the concentrated product with formaldehyde added in an amount of 20–30% of that initially introduced, in a neutral medium at a temperature of 60–102° C., till the content of free formaldehyde in the product becomes 4–7%, stabilizing the resulting product, after cooling thereof, with an alkaline agent, the desired product being thus produced.

2. A method as claimed in claim 1, wherein the condensation of urea with formaldehyde is carried out at a molar ratio of 1:2, at pH ranging from 7.2 to 8.0 and a temperature of 96 to 100° C. respectively.

3. A method as claimed in claim 1, wherein the organic sulphonic acid used is an aliphatic sulphonic acid selected from the group consisting of ethyl-sulphonic acid, butyl-sulphonic acid, octyl-sulphonic acid and of sulphonic acids that are obtained by sulphonation of paraffin hydrocarbons taken either separately or in mixtures.

4. A method as claimed in claim 1, wherein the organic sulphonic acid used is an aromatic sulphonic acid selected from the group consisting of benzene-sulphonic acid, toluene-sulphonic acid, xylene-sulphonic acid, naphthalene-sulphonic acid, and salicyl-sulphonic acid.

5. A method as claimed in claim 1, wherein the condensation in the presence of organic sulphonic acids is carried out at pH ranging from 5.0 to 5.5 and at a temperature ranging from 96 to 100° C.

6. A method as claimed in claim 1, wherein the neutralization of the condensation product is effected with sodium hydroxide to pH within 7.2–7.5.

7. A method as claimed in claim 1, wherein the concentration of the condensation product is effected under a residual pressure ranging from 100 to 300 mm. Hg, so as to remove from 70 to 80% of water therefrom.

8. A method as claimed in claim 1, wherein the concentrated product is reacted with formaldehyde at a temperature ranging from 96 to 100° C. and pH ranging from 6.8 to 7.2, the amount of formaldehyde being about 25% of the initially introduced amount thereof.

9. A method as claimed in claim 1, wherein the stabilization of the condensation product is carried out with the use of ammonia water so as to bring the pH value to 7.5–9.0 and the content of free formaldehyde in the resin to 4.0–5.5%.

10. Liquid water-soluble urea-formaldehyde resins that combine complete water-solubility with the stability of this property under prolonged storage, produced by the method as claimed in claim 1.

References Cited

UNITED STATES PATENTS

| | | | |
|---|---|---|---|
| 2,129,554 | 9/1938 | Russell et al. | 260—70 X |
| 2,191,818 | 2/1940 | Stiasny | 260—70 |
| 2,224,293 | 12/1940 | Finlayson | 260—69 X |
| 2,337,915 | 12/1943 | Menger et al. | 260—71 X |
| 2,369,613 | 2/1945 | Schubert | 260—69 |
| 2,601,665 | 6/1952 | Niles | 260—69 |
| 2,631,138 | 3/1953 | Dannenberg | 260—71 X |
| 3,015,649 | 1/1962 | Zorn et al. | 260—69 |
| 3,340,215 | 9/1967 | Sellet | 260—29.4 |
| 3,645,973 | 2/1972 | Shibler | 260—69 X |

HOWARD E. SCHAIN, Primary Examiner

U.S. Cl. X.R.

260—29.4 R, 71